United States Patent [19]

Sherman

[11] Patent Number: 4,831,775

[45] Date of Patent: May 23, 1989

[54] SPILL RESISTANT RODENT BAIT STATION

[76] Inventor: Daniel A. Sherman, 1355 Bobolink Pl., Los Angeles, Calif. 90069

[21] Appl. No.: 274,390

[22] Filed: Nov. 21, 1988

[51] Int. Cl.$^4$ ............................................. A01M 25/00
[52] U.S. Cl. ........................................................ 43/131
[58] Field of Search ........................................... 43/131

[56] References Cited

U.S. PATENT DOCUMENTS

| | | | |
|---|---|---|---|
| 1,325,069 | 12/1919 | Young | 43/131 |
| 2,944,364 | 7/1960 | Kelly | 43/131 |
| 4,182,070 | 1/1980 | Connelly | 43/131 |
| 4,261,132 | 4/1981 | Carothers et al. | 43/131 |
| 4,730,412 | 3/1988 | Sherman | 43/131 |

Primary Examiner—M. Jordan

[57] ABSTRACT

This invention relates to rodent bait stations in general and more specifically to a method of preventing loose bait from falling from these stations when they are tipped or shaken. This design incorporates a new and unique method of isolating the bait within the station when the station has been picked up and put into a position that would allow toxic material to fall free. In effect, the use of this device will allow users to bait for rodents in areas that might become accessible to children, pets and wildlife without fear that the rodenticide will come into contact with non-target species.

4 Claims, 1 Drawing Sheet

SPILL RESISTANT RODENT BAIT STATION

BACKGROUND OF THE INVENTION

The development of tamper-resistant rodent bait stations has grown at phenomenal rates during the last few years.

As rodenticides gained in toxicity, and as a more general use of poisons to eliminate rodent populations were used by the general public, tamper-resistant containment devices became a very apparent need to protect non-target species from contact with these powerful agents.

Among the advances in the state of the art, patents were granted to Young, U.S. Pat. No. 1,325,069, 12/1919, class 43/131 - Sherman, U.S. Pat. No. 4,349,982, 9/1982, class 43/131 - Sherman, U.S. Pat. No. 4,541,198, 9/1985, class 43/131, Willis U.S. Pat. No. 4,611,426, 9/1986, class 43/131, Sherman, U.S. Pat. No. 4,730,412, 3/1988, class 43/131 and foreign patent 2517930, France, 6/1983, class 43/131.

Although all these device represented significant advancement in the state of the art of rodent bait containment, they were defective in that they required that the station be mounted to a floor in order for it to secure the contents.

The object of the instant invention is to provide the user with a free standing station that contains a rodenticide, and that when shaken or tipped, will seal the rodenticide compartment from the areas that rodent travels in to feed and hide.

Although depicted in the drawings as an improvement on the Sherman U.S. Pat. No. 4,730,412, the invention is not limited to this device alone and can be applied to all rodent bait containment devices that have separate compartments for the feeding of the rodent and the area that it traverses the station through.

The features and objectives that are taught in the instant invention can be applied to an unlimited number of designs, and the advantages and novel features of the invention will become apparent in the following description and in the accompanying drawings.

DETAILED DESCRIPTION OF THE DRAWINGS

Figure 1:
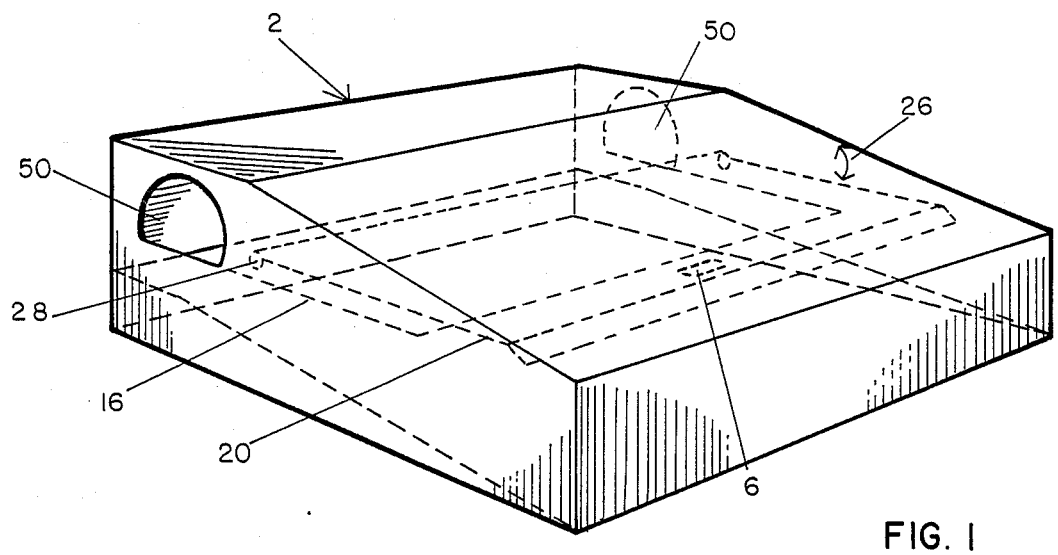
FIG. 1 details the overall construction of the Spill Resistant Rodent Bait Station showing the relative construction and positioning of the elements. In this we depiction we see the interior trap door in the closed position and the relationship of said door with the tunnel access points that appear at each of the opposing ends of the structure. The bait containment area is shown below the intermediate platform.

In FIG. 1 we see the Spill Resistant Rodent Bait Station depicted generally as 2, a box like structure with two portals 50 at opposing ends for the entry and egress of rodents. An intermediate platform 16 traverses the length of the baiters interior partially forming an upper compartment and a lower one. At the top of the intermediate platform 16 is a trap door consisting of a hinged 28 flat plate 20 which passes over the intermediate platform 20 but still leaves an exposed opening between the lower floor and the interior top of the baiters structure. This trap door 20 is designed to travel a measured distance 26 which closes of the exposed area and the trap door itself has a fastening system 6 located at its center. This fastening system is comprised of a Velcro strip as the material of choice, but can be a magnetic strip in the alternative, and can be spread over the entire width of the trap door 20 depending on the amount of seal desired. The use of these non permanent methods of closure allows the trap to be reset by simply pushing down on the trap 20. As an additional alternative, an adhesive strip can be used when a permanent closure is desired. Although depicted as a single lateral trap, the platform 20 can be converted to vertical configuration for closure of openings between various compartments of rodent bait stations and to isolate bait from other portions of the station (not shown).

Figure 3:
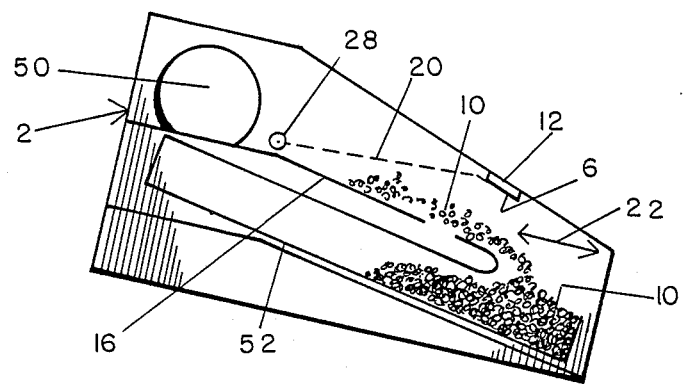
FIG. 3 shows the trap door in the closed position and demonstrates the bait having been sealed in the lower compartment and thereby isolated from the entry portal preventing spillage. Bait is shown to be caught under the trap door and the sealing mechanism in relation to the top surface is clearly shown as the baiter is tipped or has been shaken.

In FIG. 3 we see a side view of the Spill Resistant Rodent Bait Station 2 and the relationship of the various elements of the device. The intermediate platform 16 is shown directly below and parallel to the trap door 20. Its hinged end 28 is depicted as being at the opposing end of the platform 20 and nearest the rodent entry and egress portals 50. This forms a direct opening for the rodents to enter the portals 20 and traverse the hinged 28 trap door 20 to gain direct access to the bait located below in an independent box 52 and in the opening formed when said box in folded back exposing the bait 10. The inside top cover of the station has an opposing closure to 6 noted as 12. When the unit is tipped or shaken, the trap door 20 rises and the closure on the trap 20 locks with its counterpart 12 forming the seal.

Figure 2:
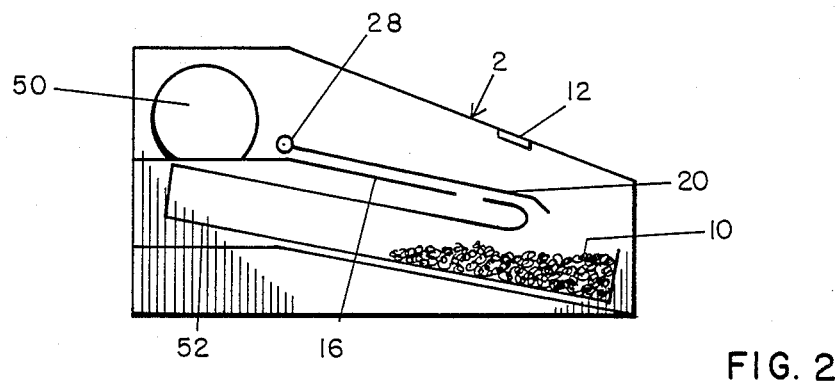
FIG. 2 is a side view of the baiter with the trap door in the down and open position. This drawing demonstrates the open access to the bait located below the trap door. Also depicted is an independent box of bait that has been folded down at its front to leave an open area for the rodent to attack the poisened bait. The trap door and its relationship to its hinged end is depicted as well as the relationship to the entry portal.

In FIG. 2 we see a side perspective of the Spill Resistant Rodent Bait Station 2 in the closed configuration. The trap door 20 has pivoted on its hinge 26 and the opposing closures 6 and 12 meet to hold the trap door 20 in the up position. This effectively blocks the poisoned bait 10 located in the opening 22 from moving along the top of the trap door 20 or to be passed along the intermediate platform 16 to reach the openings formed at each side as entrance and egress portals 50.

What I claim is:

1. A rodent bait station; said bait station having its interior divided into a plurality of compartments; said compartments comprised of areas for the storage and presentation of a rodenticide and to allow the rodent to enter and egress the bait station; said bait station containing a hinged moveable plate; said plate affixed in a manner that will block the area between the storage and presentation areas of said bait station and the area that allows the rodent entrance and egress of said station when said station has been shaken or tipped; said plate containing a closure that locks set plate in place preventing the transfer of poisoned bait from one area to another.

2. A rodent bait station as in claim 1 whose hinged movable plate contains a locking closure constructed of a Velcro fastening system; said plate containing one member of said fastening system that cooperates with a second member of said fastening system placed on an interior wall of said baiter.

3. A rodent bait station as in claim 1 whose hinged movable plate contains a locking closure constructed of two magnetic strips; said plate containing a magnetic strip that cooperates with the opposing polarity of magnetic strip placed on a wall of said baiter.

4. A rodent bait station as in claim 1 whose hinged movable plate contains a locking closure constructed of self adhesive material; said self adhesive material being located at a forward edge of said movable plate; said self adhesive material being capable of sticking to an interior surface of said bait to complete closure of said movable plate.

* * * * *